US007209150B2

(12) United States Patent
Lowles et al.

(10) Patent No.: US 7,209,150 B2
(45) Date of Patent: Apr. 24, 2007

(54) SYSTEM AND METHOD FOR ACHIEVING OPTIMAL DISPLAY CONTRAST IN A MOBILE COMMUNICATION DEVICE

(75) Inventors: Robert J. Lowles, Waterloo (CA); Marek Reksnis, Kitchener (CA); Phat H. Tran, Waterloo (CA)

(73) Assignee: Research In Motion Limited, Waterloo (CA)

( * ) Notice: Subject to any disclaimer, the term of this patent is extended or adjusted under 35 U.S.C. 154(b) by 471 days.

(21) Appl. No.: 10/007,831

(22) Filed: Nov. 5, 2001

(65) Prior Publication Data

US 2002/0054010 A1 May 9, 2002

Related U.S. Application Data

(60) Provisional application No. 60/246,126, filed on Nov. 6, 2000.

(51) Int. Cl.
G09G 5/10 (2006.01)
G09G 3/36 (2006.01)

(52) U.S. Cl. .................. 345/690; 345/89; 345/102

(58) Field of Classification Search ............ 305/87–89, 305/101–102, 690; 345/690, 87–89, 101–102, 345/204
See application file for complete search history.

(56) References Cited

U.S. PATENT DOCUMENTS 5,517,212 A * 5/1996 Inoue .................. 345/211
5,554,912 A * 9/1996 Thayer et al. .............. 315/157
5,884,085 A    3/1999 Sakai et al.
5,933,089 A * 8/1999 Katada ...................... 340/7.55
6,501,450 B1* 12/2002 Bjerke .......................... 345/84
6,618,045 B1* 9/2003 Lin ............................ 345/207

FOREIGN PATENT DOCUMENTS

CA        1327855        3/1994

* cited by examiner

Primary Examiner—Richard Hjerpe
Assistant Examiner—Duc Dinh
(74) Attorney, Agent, or Firm—Jones Day; Krishna K. Pathiyal; Robert C. Liang

(57) ABSTRACT

A system and method for achieving optimal display contrast in a mobile communication device is provided. The system includes a memory device, a processor, a display driver, and a display. A user contrast setting is stored in the memory device, wherein the user contrast setting is selected from a range of user contrast settings. The processor includes an operating system that is configured to retrieve the user contrast setting from the memory device, convert the user contrast setting into a hardware contrast setting, and save the hardware contrast setting to a memory location. The display driver retrieves the hardware contrast setting from the memory location and generates a contrast control voltage as a function of the hardware contrast setting. The display is coupled to the contrast control voltage and has a variable contrast ratio, wherein the variable contrast ratio of the display is controlled by the contrast control voltage.

25 Claims, 6 Drawing Sheets

SYSTEM AND METHOD FOR ACHIEVING OPTIMAL DISPLAY CONTRAST IN A MOBILE COMMUNICATION DEVICE

CROSS-REFERENCE TO RELATED APPLICATION

This application claims priority from and is related to the following prior application: "Method To Achieve Optimal Contrast For An LCD In A Mobile Device," U.S. Provisional Application Ser. No. 60/246,126, filed Nov. 6, 2000. This prior application, including the entire written description and drawing figures, is hereby incorporated into the present application by reference.

BACKGROUND

1. Field of the Invention

This application relates generally to a liquid crystal display (LCD) in a mobile communication device. More particularly, the invention provides a system and method for achieving optimal display contrast in mobile communication devices, such as Personal Digital Assistants, cellular telephones, and wireless two-way e-mail communication devices (collectively referred to herein as "mobile devices").

2. Description of the Related Art

Mobile devices typically include a liquid crystal display (LCD) to display information to the mobile device user. Known mobile devices enable the mobile device user to control the contrast of the LCD with an external user interface, such as a thumb wheel. Contrast is the difference in luminance between an on and an off pixel on the LCD. The contrast range on a typical LCD is generally unduly broad, leaving only a small range over which a mobile device user will typically set the preferred contrast. For instance, if the user of a typical mobile device can control the contrast of the mobile device's LCD using a thumb wheel, then the extremely high position of the thumb wheel will generally result in all of the pixels being dark and the extremely low position of the thumb wheel will generally result in all of the pixels being light. At either the high or low contrast setting, the user will typically not be able to ascertain the difference between on and off pixels. It is typically only within a range of settings between the extremely low and high positions of the thumb wheel that a desired contrast setting may be achieved.

In addition, the contrast in an LCD often varies significantly from one LCD manufacturer to another, and may even vary between two LCDs from the same manufacturer. This deviation in LCD contrast makes it difficult for a mobile device manufacturer to calibrate the LCD in each mobile device to an optimal contrast setting before delivery to the user. For instance, the optimal LCD contrast setting on one mobile device may be at a point below the center of its contrast range, while the optimal contrast setting on another mobile device may be at a point above the center of its contrast range. As a result, mobile device manufacturers must often special order LCDs to match particular operating voltage specifications, increasing the cost of the display and thus the mobile device.

SUMMARY

A system and method for achieving optimal display contrast in a mobile communication device is provided. The system includes a memory device, a processor, a display driver, and a display. A user contrast setting is stored in the memory device, wherein the user contrast setting is selected from a range of user contrast settings. The processor executes an operating system that is configured to retrieve the user contrast setting from the memory device, convert the user contrast setting into a hardware contrast setting, and save the hardware contrast setting to a memory location. The display driver retrieves the hardware contrast setting from the memory location and generates a contrast control voltage as a function of the hardware contrast setting. The display is coupled to the contrast control voltage and has a variable contrast ratio, wherein the variable contrast ratio of the display is controlled by the contrast control voltage.

DETAILED DESCRIPTION

Figure 1:
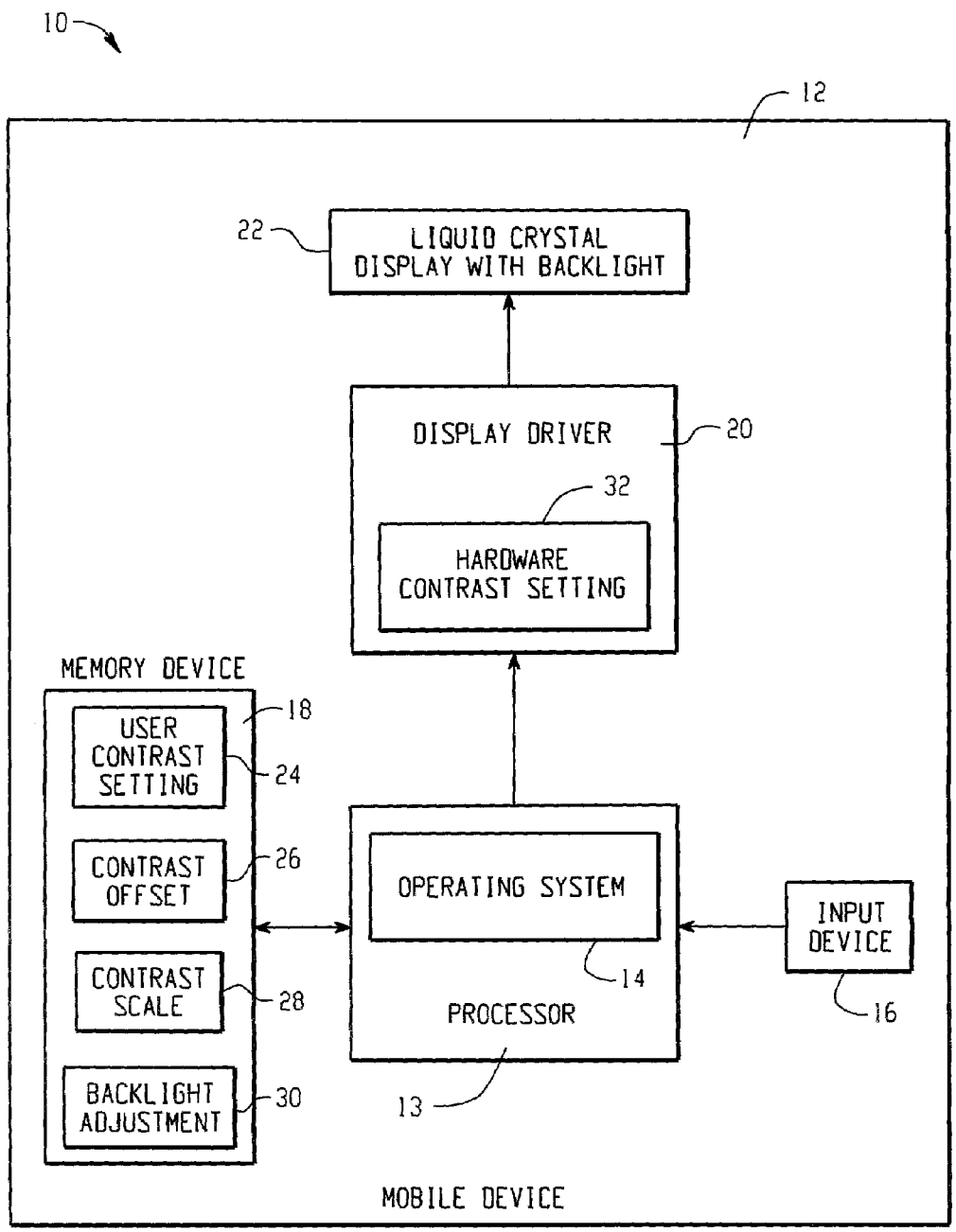
FIG. 1 is a block diagram of a liquid crystal display (LCD) contrast control system in a mobile device.

Referring now to the drawing figures, FIG. 1 is a block diagram of a liquid crystal display (LCD) contrast control system 10 in a mobile device 12. The system 10 includes a processor 13, an input device 16, a memory device 18, a display driver 20 and an LCD 22. The processor 13 executes an operating system 14. The memory device 18 stores a user contrast setting 24, a contrast offset 26, a contrast scale 28 and a backlight adjustment 30. In addition, the display driver 20 preferably stores a hardware contrast setting 32. Operationally, the system 10 converts the user contrast setting 24 into the hardware contrast setting 32 in order to set the contrast ratio of the LCD 22, wherein the optimal user contrast setting 24 is preferably at the center of a usable contrast range.

The contrast of the LCD 22 is controlled by a contrast voltage from the display driver 20. As the voltage supplied to the LCD 22 is increased, the pixels on the LCD 22 become darker, thus affecting the contrast ratio of the LCD 22. The contrast ratio of an LCD is the ratio of the brightest pixels on the LCD over the darkest pixels on the LCD. As the contrast voltage supplied by the display driver 22 is increased from its minimum value, the luminance of the on (dark) pixels increases until the contrast ratio of the LCD 22 reaches its maximum or optimal value. At the maximum contrast ratio, the difference between the on (dark) and off (light) pixels is at its greatest possible value, and the contrast of the LCD 22 is optimal. As the contrast voltage from the display driver 22 is further increased above the optimal level, the off (light) pixels become darker, reducing the contrast ratio until the screen appears black.

Figure 2B:
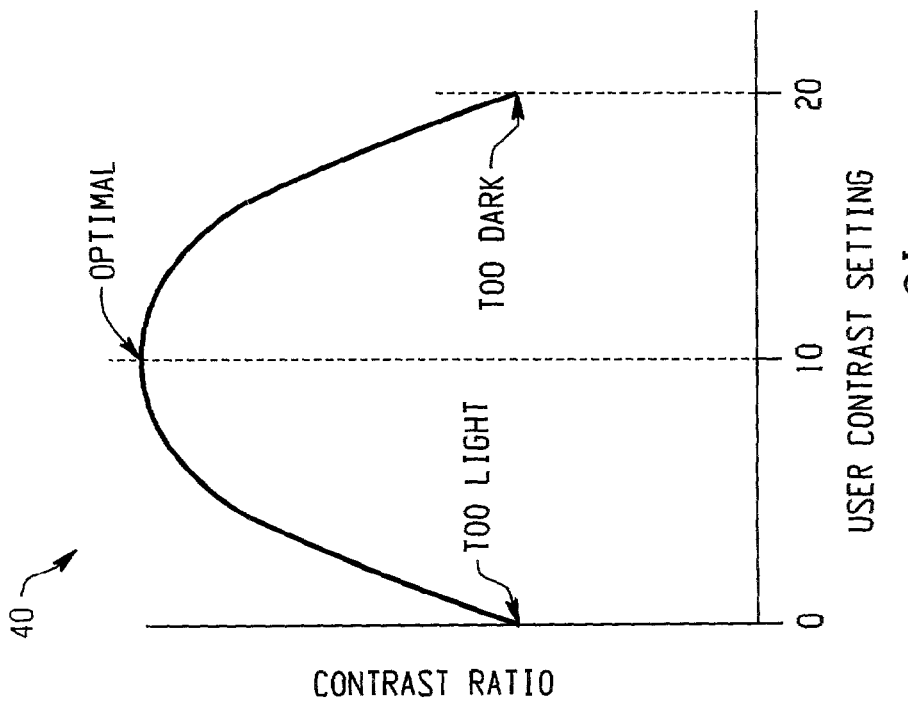
FIGS. 2(a) and 2(b) are graphs illustrating, respectively, the relationship between the contrast ratio of the LCD and the hardware and user contrast settings.
Figure 2A:
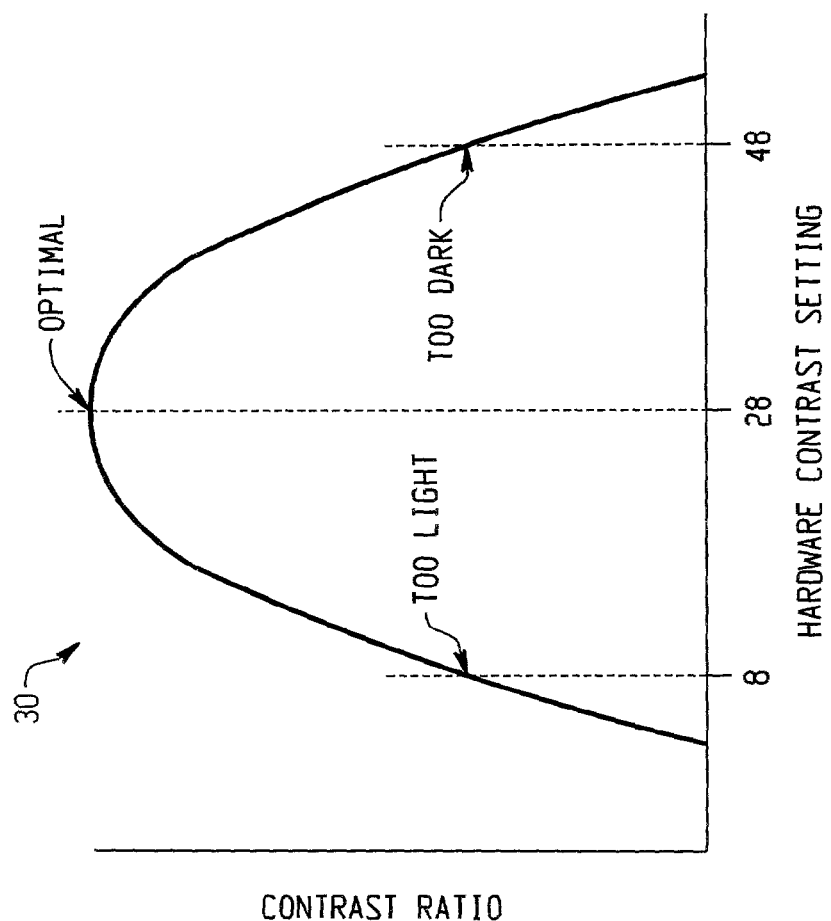

The voltage supplied to the LCD 22 from the display driver 20 is controlled by the hardware contrast setting 32, which is preferably an integer. The hardware contrast setting 32 is preferably stored in a memory location on the display driver 22, but may alternatively be stored in any memory location on the mobile device 12 that is accessible by the display driver 22. The hardware contrast setting 32 preferably corresponds to a voltage level supplied by the display driver 20, and thus determines the contrast ratio of the LCD 22. Because the contrast may vary from one LCD to another, however, the hardware contrast setting 32 corresponding to the optimal contrast of the LCD 22 may not be at the center of the hardware contrast setting range. For instance, as illustrated in FIG. 2(a), if the range of possible hardware contrast settings 32 is from zero (0) to sixty (60), the optimal setting for the LCD 22 might be at a value above or below the midpoint (30), such as twenty-eight (28).

The user contrast setting 24 is preferably an integer stored in the memory device 18 that corresponds to a hardware contrast setting 32. The range of available user contrast settings 24 for the mobile device 12 is preferably a usable range, such that substantially the entire range consists of contrast ratio settings that may be desirable to a mobile device user. The lowest available user contrast setting 24 preferably corresponds to a hardware contrast setting 32 at which the on (dark) pixels of the LCD 22 have a very low luminance, but may still be distinguished from the off (light) pixels. Similarly, the highest available user contrast setting 24 preferably corresponds to hardware contrast setting 32 at which the off (light) pixels have a very high luminance, but are still distinguishable from the on (dark) pixels. In addition, the user contrast setting 24 at the center of the available range preferably corresponds to the hardware contrast setting 32 resulting in the maximum (or optimal) contrast ratio for the LCD 22. For instance, as illustrated in FIG. 2(b), if the range of possible user contrast settings 24 is from zero (0) to twenty (20), then a user contrast setting of ten (10) will preferably result in an optimal LCD contrast ratio.

The contrast offset 26, contrast scale 28 and backlight adjustment 30 are preferably integers, which are calibrated and stored in the memory device 18 by the mobile device manufacturer, and which are used by the operating system 14 to convert the user contrast setting 24 into the hardware contrast setting 32. The contrast scale 28 is preferably calibrated by the mobile device manufacturer to map the range of user contrast settings to a preferred range of hardware contrast settings. For instance, with reference to FIGS. 2(a) and 2(b), the contrast scale 28 is preferably calibrated such that the maximum user contrast setting of twenty (20) corresponds to the hardware contrast setting of forty-eight (48) at which the LCD 22 becomes almost entirely dark, and the minimum user contrast setting of zero (0) corresponds to the hardware contrast setting of eight (8) at which the LCD 22 becomes almost entirely light. Similarly, the contrast offset 26 is preferably calibrated by the mobile device manufacturer to map the middle of the user contrast setting range to the hardware contrast setting that corresponds to the optimal contrast ratio for the LCD 22. For instance, and with reference again to FIGS. 2(a) and 2(b), the contrast offset 26 is preferably calibrated such that the user contrast setting of ten (10) corresponds to the optimal hardware contrast setting of twenty-eight (28). The backlight adjustment 30 is also preferably calibrated by the mobile device manufacturer, and adjusts the value of the user contrast setting 24 to compensate for the luminance provided by a backlight coupled to the LCD 22. Exemplary methods for calibrating the contrast offset 26, contrast scale 28 and backlight adjustment 30 are described below with reference to FIGS. 4, 5 and 6.

The operating system 14 executed by the processor 13 preferably converts the user contrast setting 24 into a hardware contrast setting 32 by applying the contrast offset 26 and the contrast scale 28 in the following linear equation:

$$HCS=S*UCS+O$$

where HCS is the hardware contrast setting 32, S is the contrast scale 28, UCS is the user contrast setting 24, and O if the contrast offset 26. For instance, FIG. 2(a) shows an exemplary range of hardware contrast settings 30 plotted as a function of the contrast ratio of the LCD 22, and FIG. 2(b) shows an exemplary range of user contrast settings 40 corresponding to the hardware contrast settings plotted in FIG. 2(a). The usable range of hardware contrast settings plotted in FIG. 2(a) is from eight (8) to forty-eight (48), with twenty-eight (28) being the setting that corresponds to the optimal contrast ratio. The full range of user contrast settings plotted in FIG. 2(b) is from zero (0) to twenty (20), with ten (10) corresponding to the optimal contrast ratio. Thus, in order to transform a user contrast setting 24 into a value within the usable range of hardware contrast settings, the operating system would preferably apply the linear equation set forth above with a contrast offset of eight (8) and a contrast scale of two (2).

Referring again to FIG. 1, the user contrast setting 24 is preferably set at its optimal value by the mobile device manufacturer, but in a preferred embodiment may also be adjusted by a user with the input device 16. The input device 16 may be any known device capable of being used to enter text or commands into a mobile device, such as a keypad, thumbwheel, or touchscreen. In addition, the LCD 22 preferably includes a backlight that may be activated by the user in order to view the display in low lighting conditions. When the backlight is activated, the operating system 14 preferably automatically adjusts the user contrast setting 24 with the backlight adjustment 30 in order to compensate for the additional luminance provided by the backlight.

Figure 3:
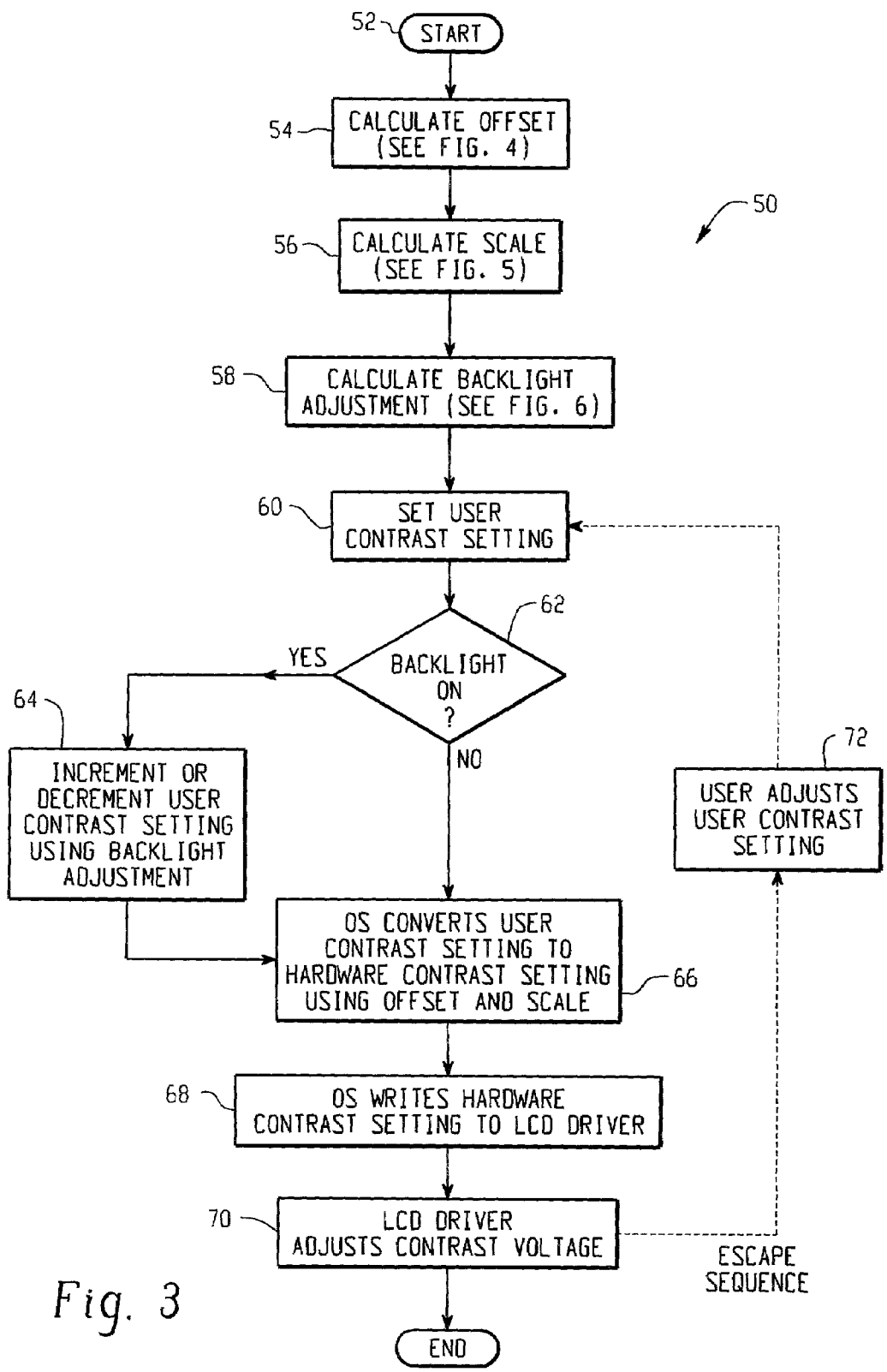
FIG. 3 is a flow diagram illustrating an exemplary method of achieving optimal contrast in an LCD.

FIG. 3 is a flow diagram illustrating an exemplary method 50 of achieving optimal contrast in an LCD. The method begins at step 52. Steps 54–58 are calibration functions that are preferably performed by the mobile device manufacturer. In step 54, the contrast offset value of the mobile device is calibrated such that the center of the range of user contrast settings corresponds to a hardware contrast setting at which the contrast ratio of the LCD is optimal. Similarly, at step 56, the contrast scale is calibrated such that the range of user contrast settings corresponds to a range of hardware contrast settings within which a difference between the on (light) and off (dark) pixels on the LCD may be perceived by a typical mobile device user. Then, in step 58, the backlight adjustment value is calibrated such that a typical mobile device user will not perceive a difference in the contrast ratio of the LCD when the backlight is on or off. Exemplary methods for calibrating the contrast offset, contrast scale, and backlight adjustment are described below with reference to FIGS. 4, 5 and 6, respectively. Once the calibration functions have been performed, the mobile device manufacturer preferably saves an optimal user contrast setting to the mobile device in step 60, which is preferably at the center of the user contrast setting range.

In steps 60–72, the contrast of the LCD 22 is set and then adjusted during the normal operation of the mobile device. In step 62, the mobile device detects whether the LCD backlight is on or off. If the backlight is on, then the operating system 14 preferably applies the backlight adjustment 30 in step 64 to increment or decrement the user contrast setting 24 to compensate for the additional luminance of the backlight. Then, in steps 66 and 68, the operating system 14 converts the user contrast setting 24 to a hardware contrast setting 32 using the contrast offset 26 and scale 28 values, and preferably writes the hardware contrast setting 32 to a memory location on the LCD driver 20. The LCD driver 20 uses the hardware contrast setting 32 to generate a contrast voltage that controls the contrast ratio of the LCD 22 (step 70). If the contrast ratio set by the LCD driver 20 is undesirable, then the mobile device user may enter an escape sequence and adjust the user contrast setting 24 in step 72. The new user contrast setting 24 entered by the user then prompts the mobile device to repeat steps 60–70 in order to save the new user contrast setting 24, convert the new setting into a hardware contrast setting 32 and adjust the contrast of the LCD 22 accordingly.

Figure 4:
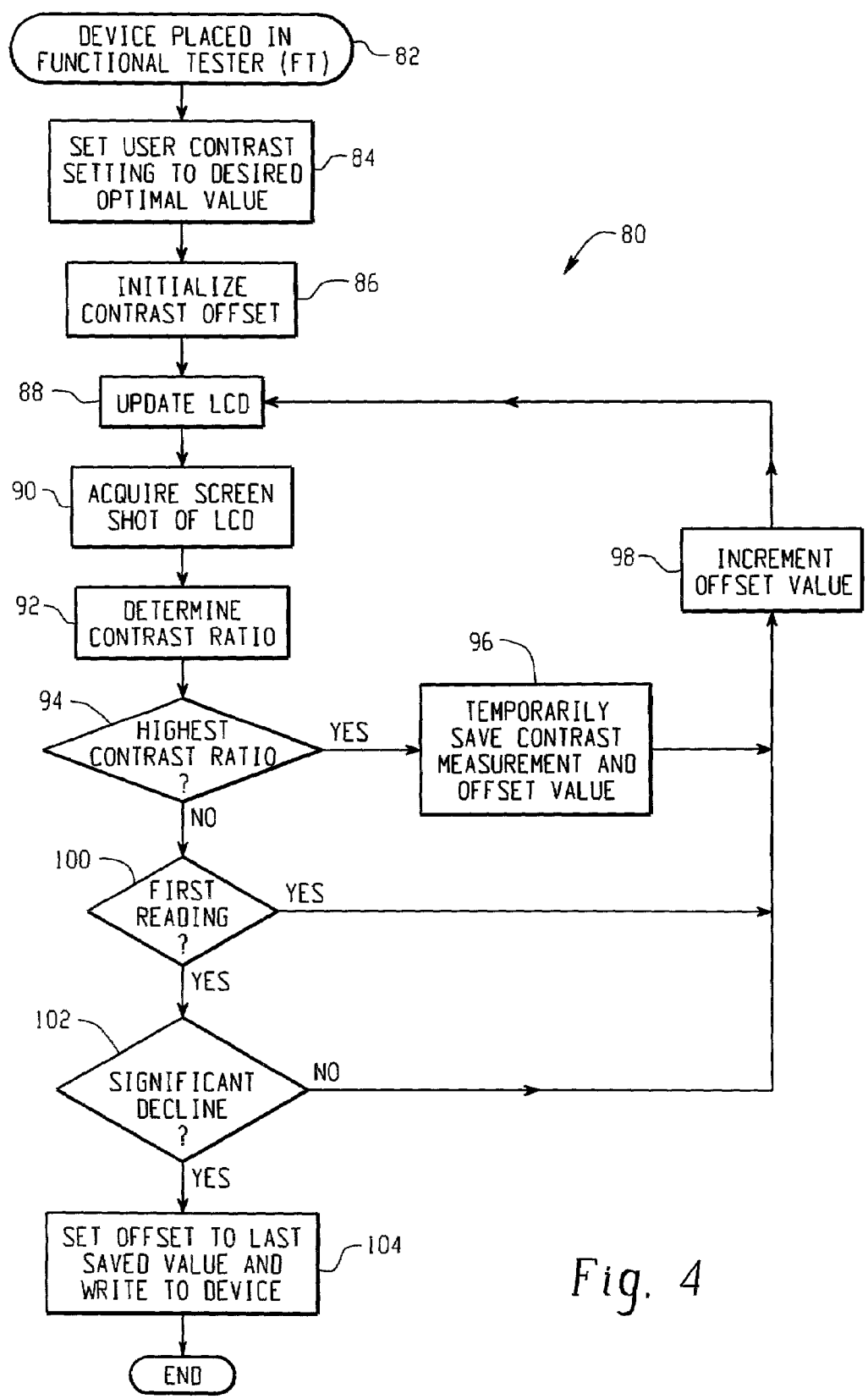
FIG. 4 is a flow diagram illustrating an exemplary method of calibrating a contrast offset value for an LCD contrast control system on a mobile device.

FIG. 4 is a flow diagram illustrating an exemplary method 80 of calibrating the contrast offset value 26 for an LCD contrast control system 10 on a mobile device 12. In step 82, the mobile device 12 is placed in a functional tester. Preferably, the functional tester includes a digital camera mounted perpendicularly to the mobile device and a light source that preferably shines a light on the mobile device's LCD at twenty-two degrees (22°) from vertical in order to achieve optimum resolution from the camera without adding luminance to the LCD. In addition, the functional tester preferably includes a processing device, such as a microprocessor, which is capable of acquiring a digital image of the mobile device's LCD from the digital camera and calculating the contrast ratio of the LCD.

Once the mobile device 12 has been properly positioned in the functional tester, the user contrast setting 24 for the device is set to the desired optimal value in step 84. The desired optimal value is the user contrast setting 24 that is to correspond to the optimal contrast ratio for the LCD, and is preferably the mid-point of the range of user contrast settings. For example, with reference to FIG. 2(*b*), the desired optimal value for the user contrast setting 24 is ten (10). In step 86, the contrast offset value 26 is initialized, preferably by setting the offset to a value that the mobile device manufacturer has determined through experience to be most likely to map the desired optimal user contrast setting 24 to the hardware contrast resulting in the optimal contrast ratio for the LCD. Alternatively, however, the contrast offset 26 may be initialized to a more arbitrary value in step 86, such as zero. Then, in step 88, the initial contrast offset is used to update the contrast of the LCD.

In step 90, the digital camera on the functional tester takes an image of the LCD, which is analyzed by the functional tester in step 92 to determine the contrast ratio. The functional tester then determines in step 94 whether the contrast ratio calculated from the newly acquired image is the highest contrast ratio that has been recorded for the mobile device during the contrast offset calibration. If the contrast ratio is determined in step 94 to be at its higher recorded value, then the functional tester preferably saves the contrast ratio and contrast offset 26 to a temporary memory location (step 96), increments the contrast offset 26 by some predetermined step value (step 98), and repeats steps 88–94. The predetermined step value is preferably chosen as a sufficiently small increment, such as one (1), in order to prevent the contrast offset 26 from overshooting its desired value by a significant amount. If the contrast ratio is not at its highest recorded value in step 94, then the functional tester preferably determines in step 100 whether the contrast ratio has been calculated from the first image taken of the mobile device during the offset calibration. If the contrast ratio is the first reading for the mobile device, then the functional tester preferably increments the contrast offset 26 by the predetermined value (step 98), and repeats steps 88–94.

If the contrast ratio is not at its highest recorded value (step 94), and it is not the first reading of the device (step 100), then in step 102 the functional tester compares the current contrast ratio reading with the previously saved contrast ratio reading (saved in step 96) to determine whether the contrast ratio of the LCD has declined significantly. A significant contrast ratio decline is preferably determined by the mobile device manufacturer to be a sufficiently large decline to indicate that the contrast ratio has past its optimal value and that the decline is not merely the result of a random fluctuation in the contrast ratio measurement. If the decline is not significant, then the functional tester preferably increments the contrast offset 26 by the predetermined value in step 98, and repeats steps 88–94. If the contrast ratio does show a significant decline, however, then the previously saved contrast offset value 26 (saved in step 96) is set as the calibrated contrast offset and is written to the mobile device in step 104.

Figure 5:
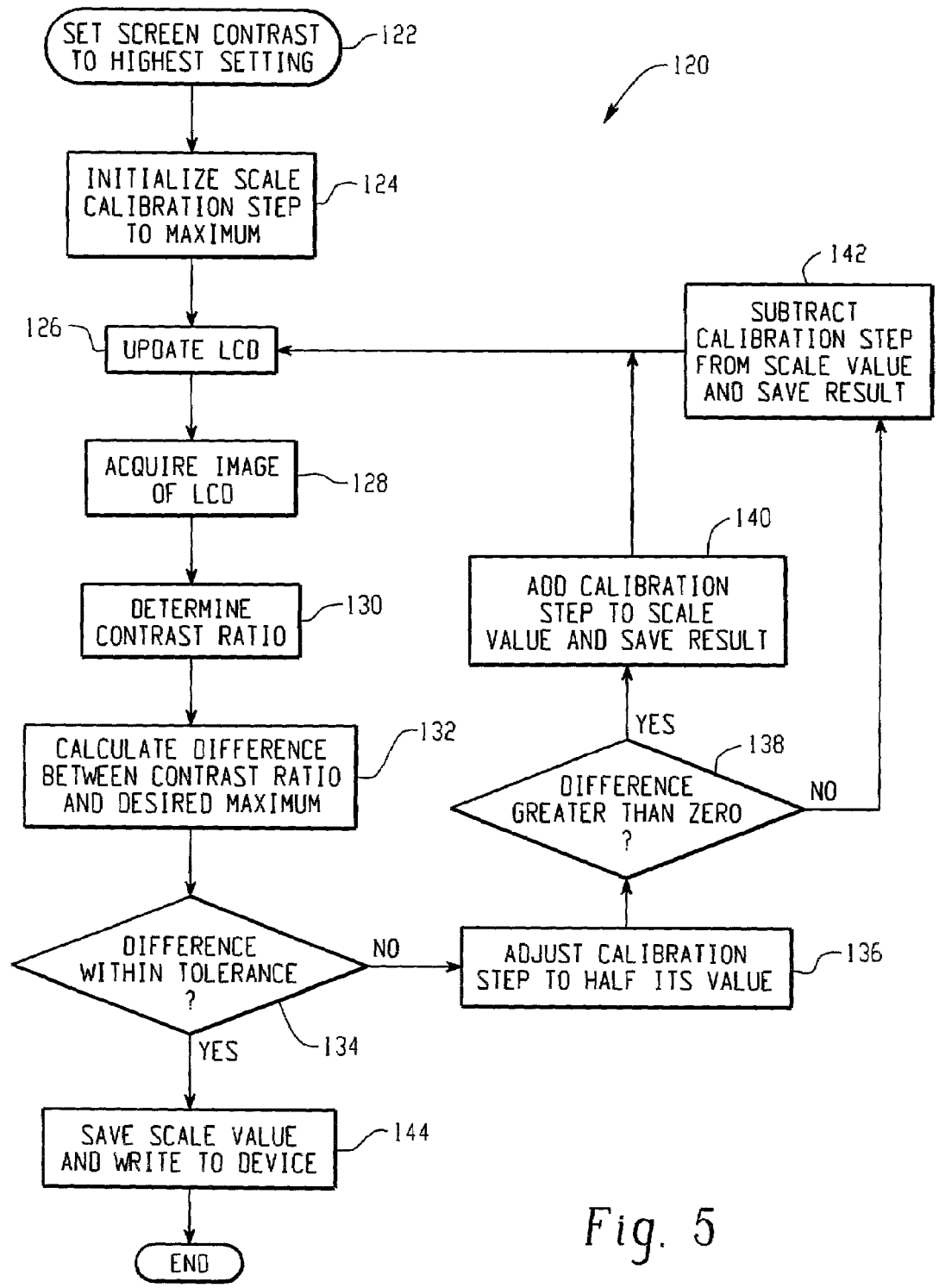
FIG. 5 is a flow diagram illustrating an exemplary method of calibrating a contrast scale value for an LCD contrast control system on a mobile device.

FIG. 5 is a flow diagram illustrating an exemplary method 120 of calibrating the contrast scale value 28 for an LCD contrast control system 10 on a mobile device 12. The method 120 is preferably performed within the same functional tester as described above with reference to FIG. 4. In step 122, the user contrast setting 24 on the mobile device 12 is adjusted to its highest setting. In step 124, the scale calibration step is set to its maximum value. The scale calibration step is the amount by which the functional tester will adjust the contrast scale 28 in order to tune the maximum user contrast setting 24 to its desired LCD contrast ratio. As described above with reference to FIG. 2(*a*), the maximum desired LCD contrast ratio preferably corresponds to the hardware contrast setting 32 at which the LCD becomes almost entirely dark, such as the hardware contrast setting of forty-eight (48) shown in FIG. 2(*a*). Then, in step 126, the scale calibration step is applied to the contrast scale, and the contrast ratio of the LCD is updated.

Once the LCD has been updated using the initial scale calibration step, an image of the LCD is acquired by the digital camera on the functional tester in step 128, and the contrast ratio of the LCD is calculated in step 130. Then, in step 132, the functional tester determines the difference between the current contrast ratio and the preferred maximum contrast ratio described above. If the calculated difference between the current contrast ratio and the preferred maximum is within a predetermined tolerance (step 134), then the contrast scale value 28 is saved and written to the mobile device 12 in step 144. If the difference is not within the predetermined tolerance, however, then the calibration step is decremented, preferably to half its value, in step 136. Then, the new calibration step is either added (step 140) or subtracted (step 142) from the contrast scale value 28, depending upon whether the current contrast ratio was calculated to be smaller or larger than the preferred maximum contrast ratio (step 138). Once the contrast scale has been adjusted by the new calibration step, steps 126–142 are repeated until the difference between the current and desired maximum contrast ratios falls within the predetermined tolerance.

In a preferred embodiment, the functional tester also calculates the amount by which the contrast scale 28 was adjusted during calibration to determine whether the calibrated contrast offset value 26 needs to be compensated. If the contrast scale 28 has been adjusted far enough to move the optimal contrast ratio from the optimal user contrast setting 24 preferably the middle setting), then the contrast offset 26 is preferably adjusted by a compensation value and resaved to the mobile device. The contrast offset 26 may, for example, by compensated using the following equation:

$$Comp = OUCS * (OScale - DScale)/256$$

where Comp is the compensation value, OUSC is the optimal user contrast setting, OScale is the calibrated (optimal) contrast scale value, and DScale is the initial (default) offset scale value. Using this equation, the compensation value (Comp) is added to the contrast offset provided that Comp is greater than zero (0).

Figure 6:
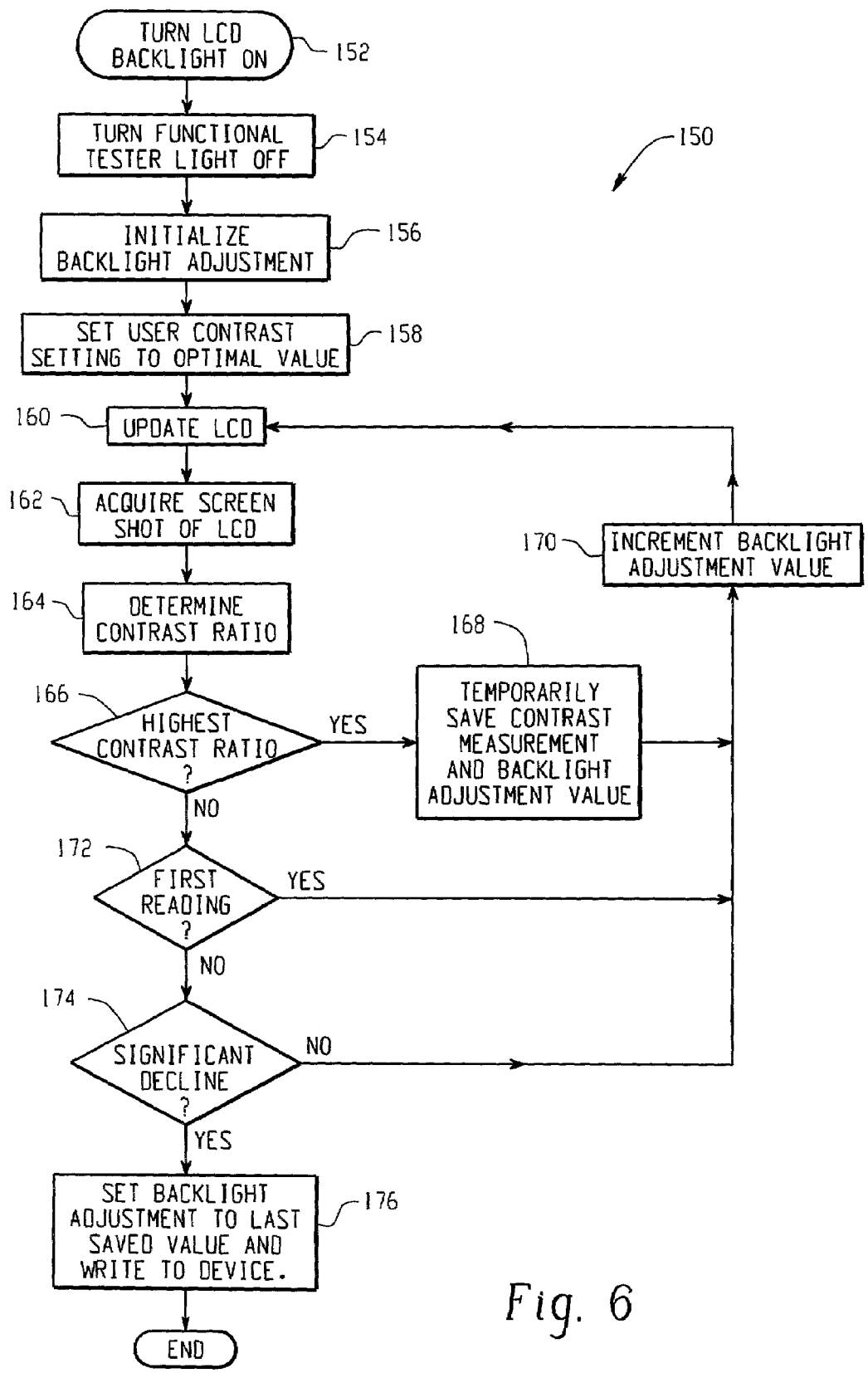
FIG. 6 is a flow diagram illustrating an exemplary method of calibrating a backlight adjustment value for an LCD contrast control system on a mobile device.

FIG. 6 is a flow diagram illustrating an exemplary method 150 of calibrating the backlight adjustment value 30 for an LCD contrast control system 10 on a mobile device 12. The method 150 is preferably performed by the same functional tester as described above with reference to FIG. 4. To begin calibration, the backlight of the LCD is turned on in step 152, and the functional tester light is turned off in step 154. The backlight adjustment value 30 is initialized, preferably to zero (0), in step 156, and the user contrast setting 24 is set to its optimal value in step 158. Then, in step 160 the initialized backlight setting 30 and user contrast setting 24 are used to update the contrast of the LCD in step 160.

In step 162, the digital camera on the functional tester takes an image of the LCD, which is analyzed by the functional tester in step 164 to calculate the contrast ratio. Then, in step 166, the functional tester determines whether the contrast ratio calculated from the newly acquired image is the highest contrast ratio recorded from the mobile device under test. If the contrast ratio is determined in step 166 to be at its highest recorded value, then the functional tester preferably saves the contrast ratio and backlight adjustment value to a temporary memory location (step 168), increments the backlight adjustment by a predetermined step value (step 170), and repeats steps 160–166. The predetermined step value is preferably set as one (1) in order to prevent the backlight adjustment from overshooting its optimal value.

If the contrast ratio is not at its highest recorded value in step 166, then the functional tester preferably determines, in step 172, whether the contrast ratio has been calculated from the first image taken during the backlight calibration of the device. If the contrast ratio is the first reading, then the functional tester preferably increments the backlight adjustment by the predetermined value (step 170), and then repeats steps 160–166.

If the contrast ratio is not at its highest recorded value (step 166), and it is not the first reading during the backlight calibration (step 172), then, in step 174, the functional tester compares the current contrast ratio with the previously saved contrast ratio (saved in step 168) to determine if the contrast ratio has significantly declined. As explained above, a significant contrast ratio decline is preferably a decline that is large enough to indicate that the contrast ratio has past its optimal value and that the decline is not resultant from measurement fluctuations. If the decline is not significant, then the functional tester preferably increments the backlight adjustment by the predetermined value in step 170, and then repeats steps 160–166. If the contrast ratio has shown a significant decline, however, then the previously saved backlight adjustment value (saved in step 168) is set as the calibrated backlight adjustment, and is written to the mobile device in step 176.

The embodiments described herein are examples of structures, systems or methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

We claim:

1. A mobile device, comprising:
   a user contrast setting stored in a memory device, wherein the user contrast setting is selected from a range of user contrast settings;
   a processor having an operating system configured to retrieve the user contrast setting from the memory device, convert the user contrast setting into a hardware contrast setting, and save the hardware contrast setting to a memory location;
   a display driver that retrieves the hardware contrast setting from the memory location and generates a contrast voltage as a function of the hardware contrast setting; and
   a display coupled to the contrast voltage and having a variable contrast ratio, wherein the variable contrast ratio of the display is controlled by the contrast voltage;
   wherein the processor limits the user contrast setting to a usable range corresponding to a usable range of the contrast voltages, the usable range of the contrast voltages being narrower than a full range of contrast voltages that the driver is configured to be capable of generating to control the contrast ratio.

2. The mobile device of claim 1, wherein the display is a liquid crystal display.

3. The mobile device of claim 1, wherein the user contrast setting is an integer.

4. The mobile device of claim 1, wherein the hardware contrast setting is an integer.

5. The mobile device of claim 1, wherein the user contrast setting selected from the middle of the range of user contrast settings results in an optimal contrast ratio for the display.

6. The mobile device of claim 1, wherein the highest user contrast setting that may be selected from the range of user contrast settings results in a pre-selected high contrast ratio for the display.

7. The mobile device of claim 1, wherein the lowest user contrast setting that may be selected from the range of user contrast settings results in a pre-selected low contrast ratio for the display.

8. The mobile device of claim 1, wherein the display driver includes the memory location to which the hardware contrast setting is stored.

9. The mobile device of claim 1, further comprising:
   a contrast offset stored in the memory device, wherein the contrast offset is used by the operating system to convert the user contrast setting into a hardware contrast setting.

10. The mobile device of claim 9, wherein the contrast offset is an integer.

11. The mobile device of claim 9, wherein the contrast offset is calibrated and stored in the memory device by a mobile device manufacturer.

12. The mobile device of claim 1, further comprising:
    a contrast scale stored in the memory device, wherein the contrast scale is used by the operating system to convert the user contrast setting into a hardware contrast setting.

13. The mobile device of claim 12, wherein the contrast scale is an integer.

14. The mobile device of claim 12, wherein the contrast scale is calibrated and stored in the memory device by a mobile device manufacturer.

15. The mobile device of claim 1, further comprising:
an input device coupled to the processor that enables a mobile device user to input the user contrast setting;
wherein the operating system is further configured to receive the user contrast setting from the input device and save the user contrast setting to the memory device.

16. A method of controlling the contrast ratio of a liquid crystal display (LCD) in a mobile device, comprising the steps of:
storing a user contrast setting in a memory device;
converting the user contrast setting into a hardware contrast setting using a contrast offset and a contrast scale; and
converting the hardware contrast setting into a contrast voltage using a display driver, wherein the contrast voltage controls the contrast ratio of the LCD;
activating a backlight that adds luminance to the display; and in response to the backlight being activated without using a light sensor to sense the luminance, incrementing or decrementing the user contrast setting to compensate for the luminance from the backlight, the incrementing or decrementing being determined based on a backlight adjustment stored in the memory device.

17. The method of claim 16, comprising the additional step of:
receiving the user contrast setting from a mobile device user.

18. The method of claim 16, comprising the additional step of:
storing the hardware contrast setting in a memory location.

19. The method of claim 16, wherein the user contrast setting is selected from a range of user contrast settings having a middle setting, and comprising the additional step of:
calibrating the contrast offset such that the middle setting in the range of user contrast settings corresponds to an optimal contrast ratio for the LCD.

20. The method of claim 19, wherein the calibration step is performed by a mobile device manufacturer.

21. The method of claim 16, wherein the user contrast setting is selected from a range of user contrast settings, and comprising the additional step of:
calibrating the contrast scale such that the range of user contrast settings falls between a pre-selected low contrast ratio for the LCD and a pre-selected high contrast ratio for the LCD.

22. The method of claim 21, wherein the calibration step is performed by a mobile device manufacturer.

23. The method of claim 16, comprising the additional step of:
calibrating the backlight adjustment value such that the contrast ratio of the LCD when the LCD backlight is on is substantially the same as the contrast ratio of the LCD when the LCD backlight is off.

24. The method of claim 23, wherein the calibration step is performed by a mobile device manufacturer.

25. The device of claim 1 wherein the display includes a backlight that adds luminance to the display when activated, and the device further comprises a backlight adjustment stored in the memory device, wherein the backlight adjustment increments or decrements the user contrast setting to compensate for the luminance from the backlight.

* * * * *